Patented Oct. 13, 1931

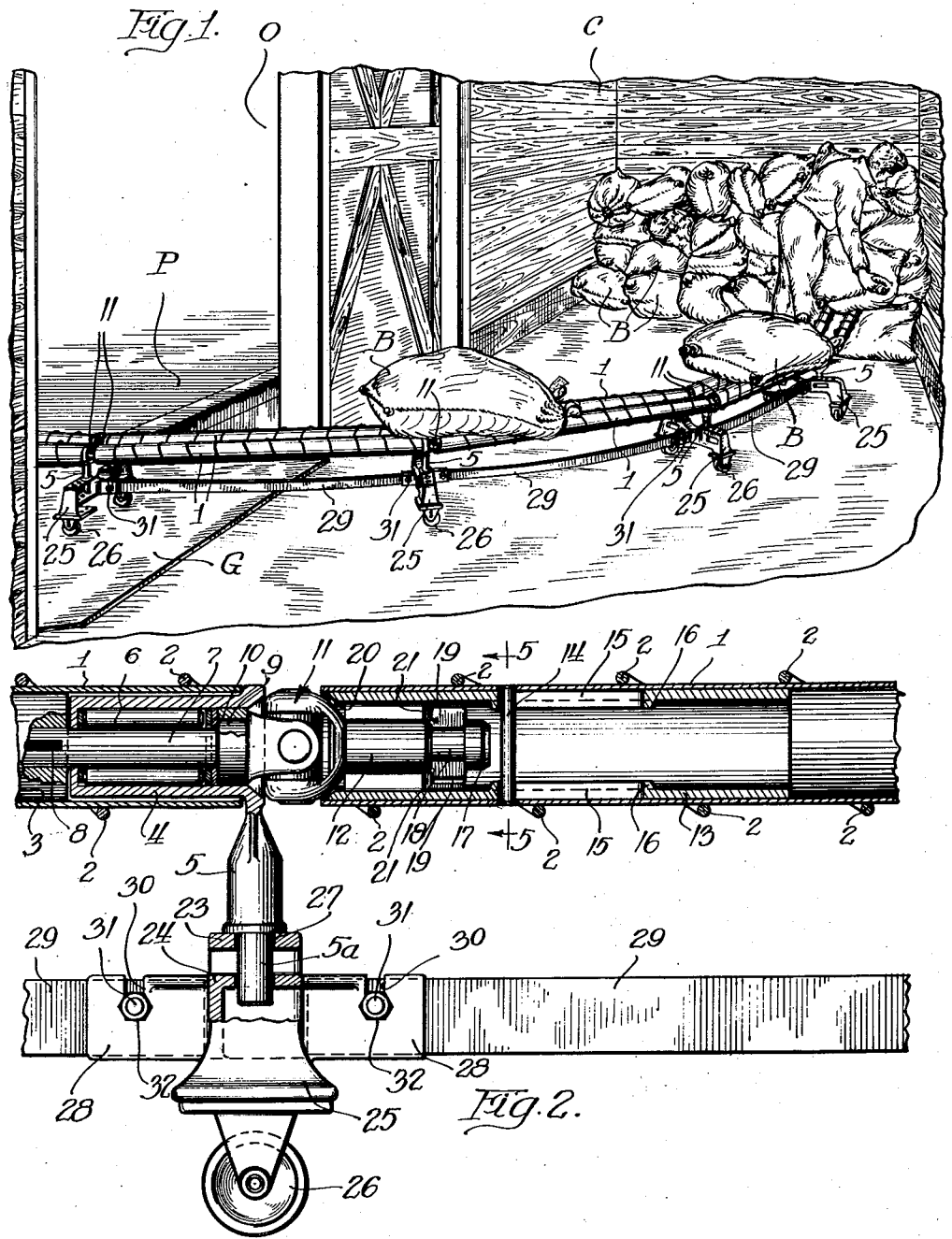

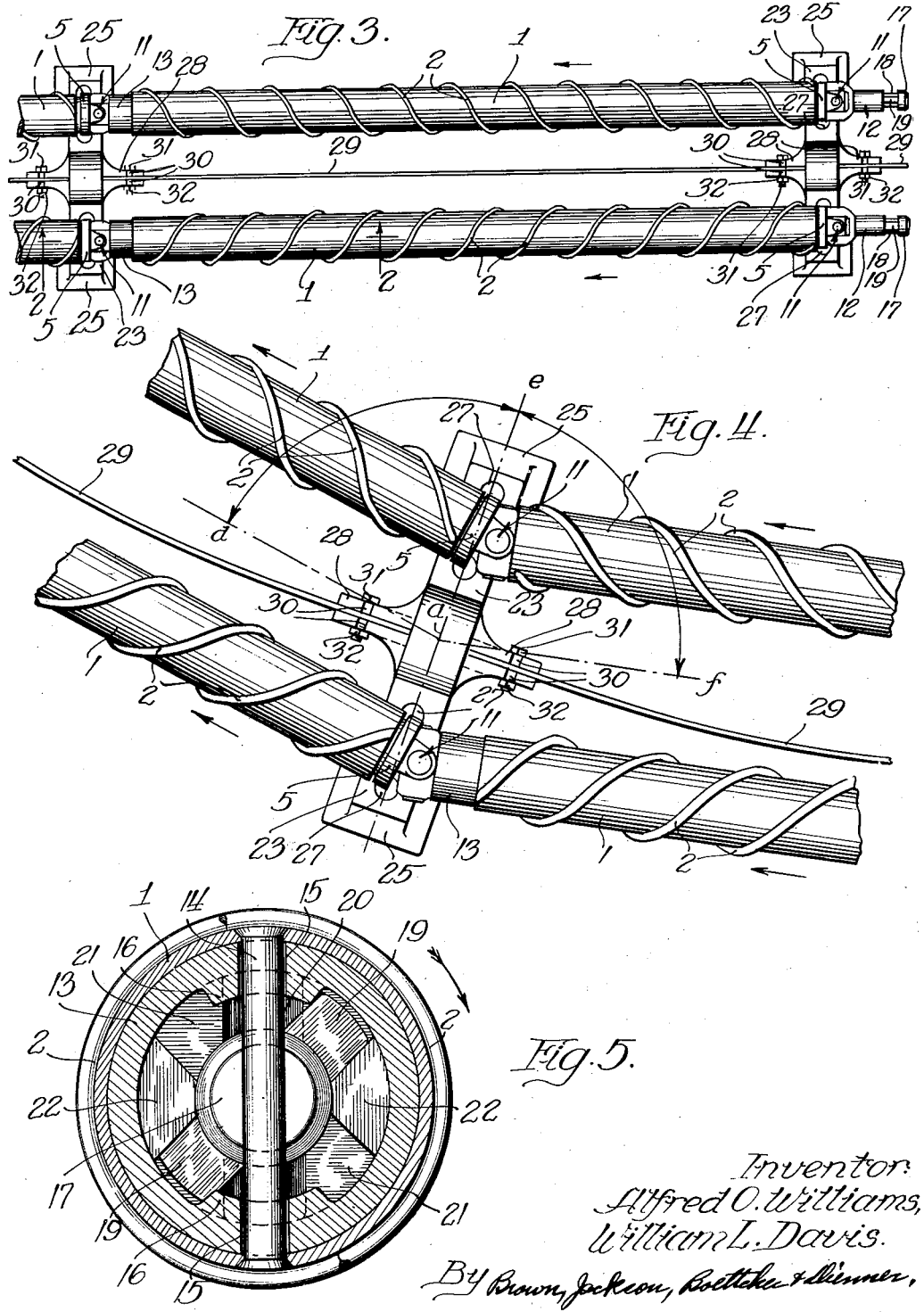

1,826,853

UNITED STATES PATENT OFFICE

ALFRED O. WILLIAMS AND WILLIAM L. DAVIS, OF BATTLE CREEK, MICHIGAN, ASSIGNORS TO CLARK TRUCTRACTOR COMPANY, OF BUCHANAN, MICHIGAN, A CORPORATION OF MICHIGAN

CONVEYER

Application filed May 15, 1931. Serial No. 537,514.

This invention relates to conveying means, and more particularly to a conveyer comprising a plurality of driven shafts provided with means for propelling along the shafts during rotating thereof, articles placed upon such shafts.

In the patent to John J. Armstrong and Robert F. Woodford, issued December 8, 1925, No. 1,564,926, there is disclosed a screw conveyer comprising threaded shafts for propelling therealong articles upon such shafts during rotation thereof, and a driving unit for rotating the shafts in opposite relation. This conveyer is portable so as to be moved readily from one scene of operation to another. It is frequently necessary to handle articles which are disposed laterally of the general direction of feed of the conveyer. Our invention has to do more particularly with means for permitting of lateral bending of the conveyer for disposing the receiving end thereof adjacent articles at either side of the main portion of the conveyer.

One of the main objects of our invention is to provide a conveyer of the character stated which is of comparatively simple and inexpensive construction and is capable of lateral flexing in such manner as to obviate the necessity of employing a supplemental conveyer for delivering to the main conveyer articles disposed to either side of the latter. A further object is to provide means for facilitating lateral bending of the conveyer while maintaining the proper relation between the shafts thereof. It is also an object of our invention to provide a conveyer so constructed that it is capable of both lateral and vertical flexing or bending. Further objects and advantages of our invention will appear from the detailed description.

In the drawings:

Figure 1 is a perspective side view of a conveyer constructed in accordance with our invention, in use;

Figure 2 is a section taken substantially on line 2—2 of Figure 3, parts being shown in elevation;

Figure 3 is a fragmentary plan view of the conveyer with the parts thereof disposed for transporting articles in a straight line;

Figure 4 is a fragmentary plan view of the conveyer with the parts disposed for conveying articles about a curve or bend;

Figure 5 is a section taken substantially on line 5—5 of Figure 2 on an enlarged scale.

The conveyer comprises two driven shafts which include a plurality of sections 1 disposed in endwise relation. Preferably, these sections are of tubular construction, as in Figures 2 and 5. The sections of each shaft are suitably supported at the ends thereof, and the adjacent ends of the sections are connected together by a driving connection which is laterally flexible and telescopes one of the shaft sections so as to permit of relative lateral movement thereof. Preferably, the driving connection between the shaft sections includes a universal joint whereby the sections are capable of relative vertical movement as well as relative lateral movement. The conveyer thus constructed comprises a plurality of sections capable of both relative lateral movement and relative vertical movement while maintaining the drive between the sections of the respective shafts. Each of the shaft sections 1 is provided with an element 2 secured helically about the same and constituting a thread for the shaft section. The threads of the two shafts are oppositely related and the shafts are driven in opposite and proper directions for propelling along the shafts, by means of the threads 2, articles placed thereon. For propelling the shafts we prefer to employ the power unit disclosed in the copending application of Alfred O. Williams, for conveyer, filed September 26, 1930, Serial No. 484,546. The shafts may, however, be driven in any other suitable or preferred manner.

Each shaft section 1 is provided, adjacent one end thereof, with a collar 3 suitably secured within the shaft section, as by welding, or in any other suitable manner. A bearing sleeve 4, carried by an upright 5, extends into the end of the shaft section to within a short distance of collar 3. This sleeve receives roller bearings 6 which support a stub shaft 7, the inner end portion of which has driving connection with collar 3, as by means of a rib 8 formed integrally with the shaft and projecting into a corresponding groove in the collar 3. Adjacent its outer end the stub shaft 7 is provided with a head 9 rotatably mounted in a bushing 10 suitably secured in sleeve 4. The outer end of stub shaft 7 is connected by a universal joint 11, of known type, to the outer end of a stub shaft 12 which projects into a relatively long sleeve 13 which fits snugly into the end of the next adjacent shaft section 1 and is slidable therein. Each of the shaft sections 1 is provided at one end thereof with a collar 3 and associated parts and at the other end thereof with a sleeve 13 and associated parts. The sleeve 13 has driving connection with its associated shaft section 1 by means of a pin 14 secured through such shaft section diametrically thereof and passing through slots 15 in the sleeve, this sleeve preferably being provided with reenforcing elements 16 extending about and defining such slots. Stub shaft 12 is provided, at its inner end, with a head 17 connected to the body portion of the shaft by a reduced neck 18. Lugs 19 project radially from neck 18 at diametrically opposite points thereof. These lugs are insertable through slots 20 extending through a shoulder 21 which projects inwardly of sleeve 13 adjacent the outer end thereof. In coupling together the shaft sections, stub shaft 12 is inserted into sleeve 13, as in Figure 2. Assuming that the driving unit is to the left as considered in Figure 2, and that the conveyer shaft is driven in a clockwise direction as considered in Figure 5, the lugs 19 contact lugs 22 so as to drive the shaft section in which the sleeve 13 is mounted. In this manner, driving connection is established between the successive sections of the respective shafts and, as above pointed out, this connection is laterally flexible and telescopic so that the shaft sections, and consequently the sections of the conveyer, are capable of relative lateral movement.

Each of the uprights 5 is provided with a downwardly extending shank 5a which fits through alined openings in web elements 23 and 24 of a supporting member 25 of approximately elongated inverted U-shape. Preferably, this member is supported by rollers 26 suitably mounted at the ends of member 25. The uprights 5 are thus mounted upon the supporting member 25 for relative turning movement and constitute therewith supporting structures which, in conjunction with the driving connections, support the adjacent ends of the shaft sections. Conveniently each of the supports is provided with a plurality of openings 27 for reception of the shanks of the uprights 5 to permit of adjustment of the conveyer shafts toward and away from each other to suit the articles being handled. It will be noted that the supporting structures serve to support the shafts in predetermined spaced relation and to maintain corresponding sections of the shafts in parallel relation.

Each of the supports 25 is provided, at the front and the back thereof, with a lug 28 which is disposed at the transverse center of the support, this lug being vertically slotted. The lugs 28 receive the end portions of spacing members 29. Preferably, these members are in the form of flat steel strips which possess appreciable rigidity but are inherently resilient. These strips are set on edge, with the end portions thereof fitting into the slots of lugs 28. These lugs are slotted from their upper edges, at 30, to accommodate securing bolts or pins 31 which pass through the spacing strips or rods 29, these bolts having associated therewith nuts 32 for securing the spacing members 29 to the lugs 28. By slightly loosening the nuts 32, the spacing members 29 can be moved upwardly out of the lugs 28 with facility, this construction being advantageous as facilitating removal and replacement of the members 29. If pins are used instead of bolts, which is considered feasible, the spacing members 29 can be moved upwardly and out without the necessity of loosening bolts.

In Figure 1 of the drawings we have illustrated our conveyer as being used for removing articles such as bags B of material from a box car C disposed adjacent a receiving platform P, the conveyer extending through the door opening O of the car and being in part supported by a gang plank G extending between the car and the platform. The general direction of the main portion of the conveyer is approximately at right angles to the length of the car. In order that the articles may be placed upon the conveyer with facility, the end portion thereof extending into the car is bent into an arc so as to dispose the receiving end of the conveyer closely adjacent the articles to be handled, as illustrated. This bending of the conveyer laterally is permitted by the laterally flexible and telescopic driving connections between the sections of the conveyer shaft. Under ordinary conditions, the main portion of the conveyer is straight, as in Figure 3. When the conveyer is bent laterally, the spacing rods or strips 29 which connect the supports 25 are flexed or bowed laterally and each of the supports 25 is turned slightly about its central vertical axis $a$ so as to be disposed at a slight inclination across the conveyor. This turning movement of the support is such that the longitudinal axis thereof, indicated by the line $a-e$ bisects the angle $d \ a \ f$ formed by the intersecting lines $da$ and $af$ parallel to the shaft sections of the adjacent sections of the conveyer. This is shown in Figure 4, in which angle $dae$ is equal to angle $fae$. This movement of the support is due to the provision of the spacing rods or strips 29 which are preferably formed of spring steel and possess sufficient rigidity to impart turning movement to the supports in the manner set forth, while being readily flexible laterally. Due to this turning movement of the supports, when a selected portion of the conveyer is turned to either side, such portion is disposed in the form of an arc or a regular curve, the longitudinal axis of the supports of this portion of the conveyer being disposed on radii extending from a common center with which the curved portion of the conveyer is concentric. In curving the conveyer laterally in this manner, the shaft sections at the inner side of the curve are shortened, the sections at the outer side of the curve being increased in length, as in Figure 4. This adjustment or variation in length of the shaft sections is accommodated by the telescopic driving connections previously referred to. Also, since the connections between the shaft sections include universal joints, such sections have relative vertical movement. This vertical movement between the sections is possible when the conveyer is curved as above described and as illustrated in Figure 1, since the spacing rods 29 are then arched laterally and are capable of a certain amount of transverse twisting movement to accommodate relative vertical movement of the conveyer sections. It is frequently desirable, for convenience in loading, to thus raise slightly the last section of the conveyer, as in Figure 1. In this figure, the outer or rearward ends of the last shaft sections are not shown, but it will be understood that such ends of these sections are mounted upon a supporting structure in the same manner as the other sections are mounted, this supporting structure being conveniently supported in a raised position upon one or more of the bags B. If it is desired to dispose the receiving section of the conveyer at a considerable upward and rearward inclination, the spacing rod or strip 29 between the two last supports may be omitted.

After the articles have been removed from one end of the car, and it is desired to remove articles from the other end thereof, the conveyer as a whole is slid outwardly through the door opening O of the car a sufficient distance to permit of the end portion thereof being swung toward the other side, after which the conveyer is moved back into the car, the portion of the conveyer which is in the car being then curved on an arc as in Figure 1 but oppositely thereto. Under ordinary conditions, the spacing members 29 are not used throughout the entire length of the conveyer, though they may be if desired, but are usually applied only at such portion of the conveyer as it may be found desirable to shift or bend laterally. Also, under certain conditions the spacing members may be omitted, though we prefer to employ such members as assuring proper disposition of the supports relative to the conveyer sections for supporting the load to be transported to best advantage, and assuring accuracy of operation.

What we claim is:

1. In conveyer means of the character described, two driven shafts disposed in spaced relation and provided with means to contact articles placed upon the shafts and propel such articles along the shafts during rotation thereof, the shafts being of flexible and telescopic construction for permitting lateral movement of a selected portion of the conveyer relative to the remainder thereof while maintaining the drive of the shafts.

2. In conveyer means of the character described, two driven shafts provided with means to contact articles placed upon the shafts and propel such articles along the shafts during rotation thereof, and means for supporting the shafts and for holding them in predetermined spaced relation, the shafts being of flexible and telescopic construction for permitting lateral movement of a selected portion of the conveyer relative to the remainder thereof while maintaining the drive of the shafts.

3. In conveyer means of the character described, two driven shafts provided with means to contact articles placed upon the shafts and propel such articles along the shafts during rotation thereof, each shaft including a plurality of sections disposed in endwise relation, and laterally flexible and telescopic driving connections between the adjacent ends of the sections of the respective shafts and permitting relative lateral movement between the sections of the conveyer while maintaining driving connections between the shaft sections.

4. In conveyer means of the character described, two driven shafts provided with means to contact articles placed upon the shafts and propel such articles along the shafts during rotation thereof, each shaft including a plurality of sections disposed in endwise relation, means for supporting the shaft sections and for holding them in predetermined spaced relation, and laterally flexible and telescopic driving connections between the adjacent ends of the sections of the respective shafts and permitting relative lateral movement between the sections of the conveyer while maintaining driving connections between the shaft sections.

5. In conveyer means of the character described, two driven shafts provided with means to contact articles placed upon the shafts and propel such articles along the shafts during rotation thereof, each shaft including a plurality of sections disposed in endwise relation, means for supporting the shaft sections and for holding them in predetermined spaced relation, and universal and telescopic driving connections between the adjacent ends of the sections of the respective shafts permitting relative movement between the sections of the conveyer both vertically and laterally while maintaining driving connections between the shaft sections.

6. In conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, resilient spacing means connecting said structures, and laterally flexible and telescopic driving connections between the adjacent ends of the sections of the respective shafts.

7. In conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, resilient spacing means connecting said structures, and universal and telescopic driving connections between the adjacent ends of the sections of the respective shafts.

8. In a conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, resilient spacing rods connecting said structures at the transverse centers thereof, and laterally flexible and telescopic driving connections between the adjacent ends of the sections of the respective shafts.

9. In conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, resilient spacing rods connecting said structures at the transverse centers thereof, and universal and telescopic driving connections between the adjacent ends of the sections of the respective shafts.

10. In conveyer means of the character described, two driven shafts provided with means to contact articles placed upon the shafts and propel such articles along the shafts during rotation thereof, each shaft including a plurality of sections disposed in endwise relation, wheel mounted and spaced supporting structures supporting the shaft sections and holding them in predetermined spaced relation, resilient and laterally flexible spacing members of appreciable rigidity connecting the supporting structures at the transverse centers thereof, and laterally flexible and telescopic driving connections between the adjacent ends of the sections of the respective shafts.

11. In conveyer means of the character described, two driven shafts provided with means to contact articles placed upon the shafts and propel such articles along the shafts during rotation thereof, each shaft including a plurality of sections disposed in endwise relation, spaced supporting structures supporting the shaft sections and holding them in predetermined spaced relation, flexible spacing means connecting said structures at the transverse centers thereof, and laterally flexible and telescopic driving connections between the adjacent ends of the sections of the respective shafts.

12. In conveyer means of the character described, two driven shafts provided with means to contact articles placed upon the shafts and propel such articles along the shafts during rotation thereof, each shaft including a plurality of sections disposed in endwise relation, supporting structures supporting the shaft sections at the ends thereof and holding them in predetermined spaced relation, resilient and laterally flexible spacing members of appreciable rigidity connecting the supporting structures at the transverse centers thereof, and laterally flexible and telescopic driving connections between the adjacent ends of the sections of the respective shafts.

13. In conveyer means of the character described, two driven shafts provided with means to contact articles placed upon the shafts and propel such articles along the shafts during rotation thereof, each shaft including a plurality of sections disposed in endwise relation, supporting structures supporting the shaft sections at the ends thereof and holding them in predetermined spaced relation, said structures being provided at the front and the rear thereof with elements having upwardly opening slots, flat and resilient spacing members of appreciable rigidity connecting the supporting structures and disposed on edge with their end portions disposed in the slots of said elements, and laterally flexible and telescopic driving connections between the adjacent ends of the sections of the respective shafts.

14. In conveyer means of the character described, two driven shafts provided with means disposed to contact articles placed thereon and propel them along the shafts during rotation thereof, each shaft including a plurality of sections disposed in endwise relation, supports at the ends of the shaft sections, uprights mounted for turning movement in the supports and each provided with means for rotatably supporting one of the adjacent shaft sections at the end thereof, and laterally flexible and telescopic driving connections between each of the shaft sections supported by the uprights and the end of the next adjacent shaft section, said connections also supporting the end of said next adjacent shaft section.

15. In conveyer means of the character described, two driven shafts provided with means disposed to contact articles placed thereon and propel them along the shafts during rotation thereof, each shaft including a plurality of sections disposed in endwise relation, supports at the ends of the shaft sections, uprights mounted for turning movement in the supports and each provided with means for rotatably supporting one of the adjacent shaft sections at the end thereof, laterally flexible and telescopic driving connections between each of the shaft sections supported by the uprights and the end of the next adjacent shaft section, said connections also supporting the end of said next adjacent shaft section, and resilient spacing members of appreciable rigidity connecting the supports at the transverse centers thereof.

16. In conveyer means of the character described, two driven shafts provided with means disposed to contact articles placed thereon and propel them along the shafts during rotation thereof, each shaft including a plurality of sections disposed in endwise relation, means for rotatably supporting the ends of adjacent shaft sections, said supporting means having turning movement relative to the supports and including laterally flexible and telescopic driving connections between the adjacent shaft section ends, and laterally flexible resilient spacing members of appreciable rigidity connecting the supports at the transverse centers thereof.

17. In conveyer means of the character described, two driven shafts provided with means disposed to contact articles placed thereon and propel them along the shafts during rotation thereof, each shaft including a plurality of sections disposed in endwise relation, and driving connections between the adjacent ends of the shaft sections, said connections including two universally connected members extending into the ends of the shaft sections, and having driving connection therewith, one of said members telescoping its associated shaft section.

18. In conveyer means of the character described, two driven shafts provided with means disposed to contact articles placed thereon and propel them along the shafts during rotation thereof, each shaft including a plurality of sections disposed in endwise relation, and driving connections between the adjacent ends of the shaft sections, said connections including two universally connected members extending into the ends of the shaft sections, one of said members having driving connection with its associated shaft section, and a sleeve slidable in the end of the other shaft section and having driving connection therewith, the other of said members extending into and having driving connection with the sleeve.

In witness whereof, we hereunto subscribe our names this 4th day of May, 1931.
    ALFRED O. WILLIAMS.
    WILLIAM L. DAVIS.